Aug. 30, 1960 G. S. BUTTERWORTH 2,950,581
GAGING DEVICE
Filed March 30, 1959 3 Sheets-Sheet 1

INVENTOR.
GREIG S. BUTTERWORTH.
BY
*Howard S. Keiser*
*John F. Verhoeven*
ATTORNEYS.

Aug. 30, 1960 G. S. BUTTERWORTH 2,950,581
GAGING DEVICE
Filed March 30, 1959 3 Sheets-Sheet 2

INVENTOR.
GREIG S. BUTTERWORTH.
BY
Howard Keiser
& John F. Verhoeven
ATTORNEYS.

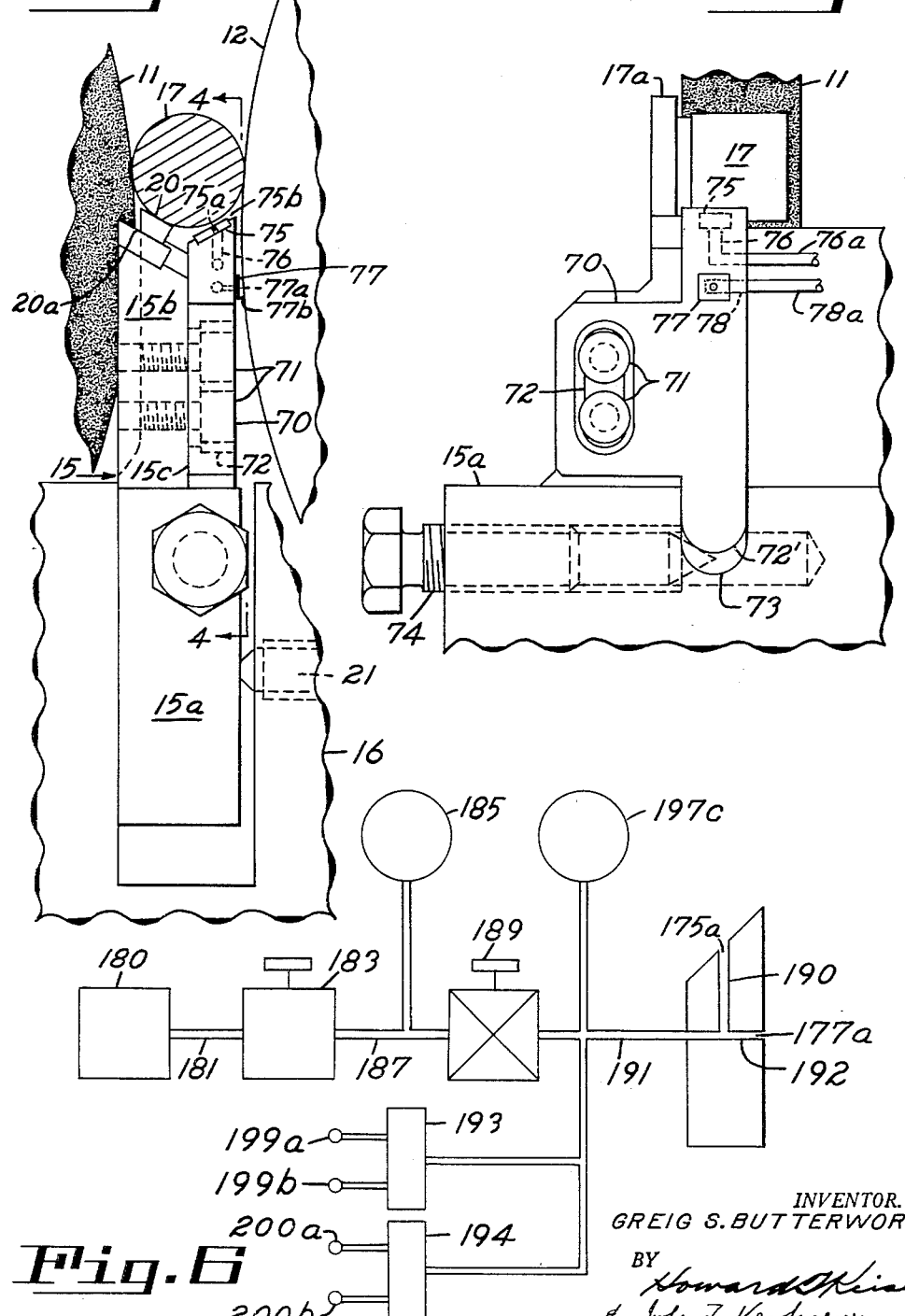

United States Patent Office 2,950,581
Patented Aug. 30, 1960

1

2,950,581

GAGING DEVICE

Greig S. Butterworth, Columbus, Ohio, assignor to The Cincinnati Milling Machine Co., Cincinnati, Ohio, a corporation of Ohio Filed Mar. 30, 1959, Ser. No. 802,787

10 Claims. (Cl. 51—103)

The present invention relates to in-process gaging particularly suitable in the control of the infeed mechanism on a centerless grinding machine in accordance with the decreasing size of the workpiece being ground.

In a machine tool such as a centerless grinding machine where the workpiece is supported, not between centers, but in a cradle-like support having sides inclined relative to each other it is convenient to measure the settling of the workpiece in the support and use this measurement as an indication of the size of the workpiece. Gaging a workpiece in this manner is disclosed, for example, in the copending application of Jessup and Grove entitled Compensating Device For Grinding Machines, Serial No. 688,521, filed October 7, 1957, now U.S. Patent No. 2,889,665, granted June 9, 1959 and assigned to the same assignee as the present invention.

However, the settling of the workpiece into the cradle support may be caused not only by the decrease in the size of the workpiece but also by the spreading of the sides of the support. To the extent that the settling of the workpiece results from this latter cause, a measurement of the settling of the workpiece will not give a true indication of the size of the workpiece. In the present invention, a device is provided which senses the settling of the workpiece in the support during an operation thereon and which, in addition, senses the spreading of the support from a predetermined size, or span, the indicating means of the device being operatively connected to both sensing means so that the indicating means reads the amount the workpiece has settled less the amount the workpiece has settled due solely to the spread of the support. This indicates the amount the workpiece has settled in the support solely as a result of size reduction in the workpiece and an accurate measure of the size of the workpiece is thereby given which may be used to control the feeding mechanism of the machine.

In a centerless grinding machine the workpiece is usually supported between the regulating wheel and the inclined face of a blade spaced therefrom, the regulating wheel and the blade thereby defining a cradle support for the workpiece. The regulating wheel and the blade, which respectively constitute the sides of the cradle support, are movable by the infeed mechanism as a unit towards and away from the grinding wheel for plunge grinding. Under certain circumstances the members constituting the sides of the cradle support, that is, the blade and the regulating wheel, will be displaced relative to each other, resulting in a spread of the support from a predetermined size which causes the workpiece to settle in the support more than the settling resulting solely from the diminution of the workpiece from grinding. This displacement may, for example, be caused by wear on the regulating wheel during grinding which results in the surface of the wheel being spaced further from the blade. Or, because of a heavy workpiece or large grinding forces being transmitted through the workpiece to the blade, the blade may be deflected slightly away from the regulating wheel.

2

In the preferred embodiment of the present invention a first sensing means includes a first air discharge passage having an orifice beneath the workpiece between the blade and the regulating wheel, the orifice being in registration with the workpiece so that pressure in the passage increases as the surface of the workpiece moves toward the orifice when the workpiece settles, or sinks, in the cradle. A member connected to the blade has a second sensing means including a second air discharge passage which has an orifice in registration with the surface of the regulating wheel so that when there is a displacement, or spread, between the blade and the surface of the regulating wheel the pressure in the second air passage decreases. The two air passages are operatively connected to an indicating means, the decrease in pressure in the second air passage compensating for the increase in pressure in the first air passage to the extent that increase resulted from the workpiece settling because of spread in the support and not because of reduction in size. This compensated pressure operates the indicating means to give a true indication of the size of the workpiece. The indicating means contains switches, one of which, when the workpiece is at a first predetermined size, operates to retard the feeding movement of the support into the grinding wheel and the other of which, when the workpiece is at finished size, operates to reverse the movement of the support and retract the workpiece from the grinding wheel.

It is therefore an object of the present invention to provide an improved in-process gaging device to sense accurately the diminishing size of a workpiece held in a cradle-like support even though the spacing between the sides of the cradle may change due to deflection or wear.

It is another object of the present invention to provide a simple effective in-process signaling device for automatic control of a machine tool responsive to the size of a workpiece supported in a cradle-like support during the operation thereon.

It is another object of the present invention to provide an improved device for controlling the feeding mechanism of a machine tool in response to the size of a workpiece supported in a cradle-like support.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Fig. 3 is an enlarged view, oriented as the view of Fig. 1, showing the structure at the grinding throat;

Fig. 4 is a view taken on the line 4—4 of Fig. 3;

Fig. 6 is a schematic diagram of a modified pneumatic circuit for the device of the present invention.

Figure 1:
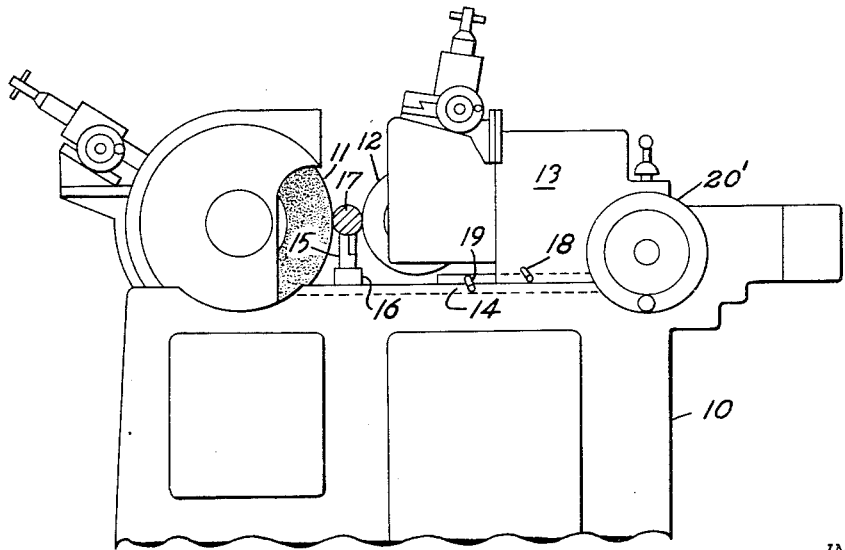
Fig. 1 is a front elevational view of a centerless grinding machine embodying the device of the present invention.

As shown in Fig. 1 the centerless grinding machine has a bed 10 upon which is mounted a grinding wheel 11 for rotation about a fixed axis. A regulating wheel 12 is mounted for rotation opposite the grinding wheel, the space between the regulating wheel 12 and grinding wheel 11 defining a grinding throat. The regulating wheel 12 is carried by an upper slide 13 which is mounted on a lower slide 14 for longitudinal movement relative thereto. The lower slide 14 is mounted on the bed and is movable longitudinally thereon towards and away from the grinding wheel 11. A workpiece supporting blade 15 is carried in a mounting block 16 connected to the lower slide 14. The blade 15 has an upper inclined face 20 (see Fig. 3) sloping downwardly toward the regulating wheel, and the workpiece 17, shown in cross-section in Fig. 1 to reveal the portion being operated on, is supported between the blade and the regulating wheel for grinding by the grinding wheel, the blade and regulating wheel defining a cradle support with the blade constituting one side thereof and the regulating wheel the other side thereof. The upper slide 13 may be selectively clamped to the lower slide 14 by clamp 18 and the lower slide 14 may be selectively clamped to the bed 10 by clamp 19. By mechanism similar to the described in U.S. Patent 2,718,101 of Stuckey and Decker issued September 20, 1955, the upper slide 13 may be moved longitudinally relative to the lower slide 14 by hand wheel 20' when clamp 18 is loosened and clamp 19 tightened. When clamp 19 is loosened and clamp 18 tightened the upper slide and lower slide 14 may be moved as a unit relative to bed 10.

During automatic power operation the clamp 18 is tightened and the clamp 19 loosened so that the upper slide 13 and lower slide 14 move as a unit thereby moving the cradle support towards and away from the grinding wheel. As shown in U.S. Patent 2,718,101 a screw 24 (see Fig. 2) is pivotally connected to a walking beam 25, one end of which is pivotally connected to shaft 26 and the other end pivotally connected to piston rod 27 so that axial movement of either shaft 26 or rod 27 will impart axial movement to screw 24. The screw 24 is threadedly engaged with a nut secured in upper slide 13 so that axial movement of the screw will move the workpiece cradle support towards and away from the grindwheel.

Figure 2:
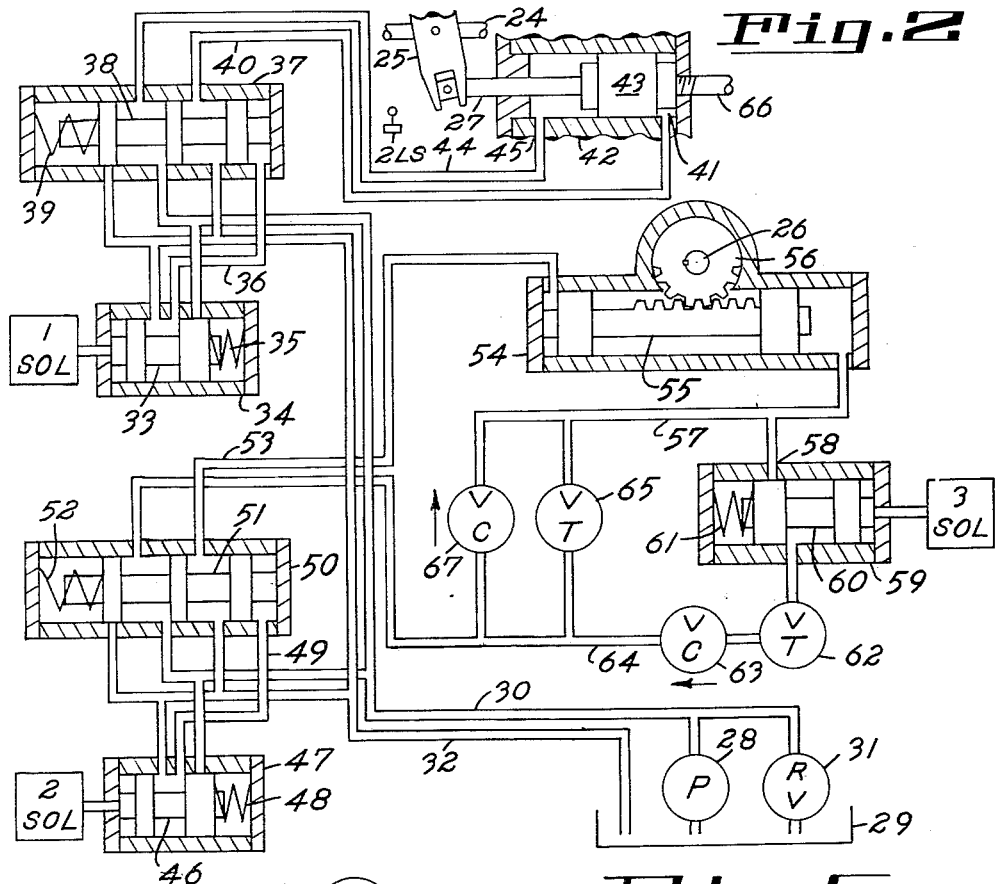
Fig. 2 is a schematic hydraulic diagram of the infeed mechanism of the machine of Fig. 1.

The portion of the hydraulic circuit of the grinding machine which is pertinent to the infeed mechanism is shown in Fig. 2 of the drawings. Fluid pressure for operating the system is provided by a hydraulic pump 28 which is driven by a suitable motor and delivers hydraulic fluid under pressure from a reservoir 29 to a pressure line 30. The pressure in the line 30 is maintained at a desired value by a relief valve 31 which returns excess fluid into the reservoir 29. A return line 32 empties into the reservoir 29 in a conventional manner. Rapid traverse of the support is effected by energizing a solenoid 1SOL whereby a spool 33 of a solenoid valve 34 is moved toward the right against the force of a spring 35. Thereby hydraulic fluid under pressure is delivered from line 30 to a line 36 which is communicatively connected with the right hand end of a control valve 37. This causes a spool 38 in the valve to be shifted to the left against the bias of a spring 39, thereby connecting pressure from the line 30 to a motor line 40. This line is connected with port 41 of the cylinder 42 and applies pressure to the right hand end of the piston 43. At the same time, a motor line 44 connected to the port 45 of the cylinder is connected by valve 37 with the return line 32 so as to permit fluid in the left hand end of the cylinder 42 to escape therefrom. Hence, the piston 43 will be moved rapidly to the left as viewed in Fig. 2, thereby moving the piston rod 27 and hence the screw 24 connected to the walking beam to the left. At the end of the rapid traverse movement, the limit switch 2LS is operated by the beam 25 thereby energizing a solenoid 2SOL. This causes a spool 46 of a solenoid valve 47 to be moved toward the right against the urgency of a spring 48. Thereby, fluid under pressure from line 30 is delivered through a line 49 to the right hand end of a control valve 50. This valve contains a spool 51, which is thereby moved toward the left against the urgency of a spring 52 so as to connect the pressure line 30 with a line 53 connected to the left hand end of a cylinder 54 containing a rack piston 55. The rack teeth on the piston mesh with the teeth of a gear 56 which is keyed to shaft 26. As described in U.S. Patent 2,718,101 the shaft 26 is threadedly engaged with a fixed nut so that rotation of the shaft 26 causes axial movement thereof and imparts axial movement to screw 24, and hence moves the cradle support towards the grinding wheel. The opposite end of cylinder 54 is connected by a line 57 with port 58 on a solenoid valve 59 which contains a spool 60 adapted to be moved toward the left against the urgency of a spring 61 when a solenoid 3SOL is energized. This connects line 57 with a fast feed rate throttle valve 62, and thence through a check valve 63 and a line 64 back to the valve 50. In the operated position of the valve 50 the line 64 is connected to the reservoir line 32, thereby permitting fluid to flow out of the right hand end of cylinder 54 and through the throttle valve 62 to reservoir. As the work approaches final size, the gage hereinafter to be described provides a signal which deenergizes 3SOL, thereby blocking the flow of fluid from line 57 through the fast feed rate throttle valve 62. The fluid flowing through line 57 is thereby constrained to pass through a slow feed rate throttle valve 65 to line 64 and thence through valve 50 to the reservoir, or return, line 32. The speed at which the piston 55 moves toward the right is thereby reduced so as to reduce the feed rate of the cradle support produced by the screw 26 and the feed shaft 24.

When the workpiece reaches final size, the gage provides a second signal which causes solenoids 1SOL and 2SOL to be deenergized. When 1SOL is deenergized, the solenoid valve 34 and control valve 37 return to the positions shown in Fig. 2 in which the motor line 44 is connected with the pressure line 30, and the motor line 40 is connected with the return line 32. The piston 43 is thereby moved to its right hand position as determined by the setting of the adjusting screw 66. When solenoid 2SOL is deenergized, the solenoid valve 47 and control valve 50 return to the positions shown in Fig. 2 wherein the motor line 53 is connected with the return line 32 while the line 64 is connected with the pressure line 30. Thereby fluid under pressure flows through a check valve 67 connected in parallel with the throttle valve 65 and through line 57 into the right hand end of the cylinder 54. The rack piston 55 is thereby rapidly returned to the position shown in Fig. 2 which corresponds to the retracted position of the workpiece support.

The device which provides the signals for controlling the infeed mechanism is carried by the blade 15, as shown in Figs. 3 and 4. The blade has a base portion 15a which is clamped in mounting block 16 by screw 21 and an upper portion 15b at the upper end of which are carried workpiece supporting faces. The face 20 is aligned with the grinding wheel 11 and supports that portion of the workpiece 17 being operated on. Other faces, such as 20a, may be provided to support other portions of the workpiece, such as the flange 17a (see Fig. 4) not being operated on. The base portion of the blade is wider than the upper portion so that the base portion extends beyond one side face 15c of the blade. A member 70 is connected to face 15c by bolts 71 engaged with a shoulder in slot 72 of member 70, the slot permitting vertical movement of the member 70 relative to blade 15 when the bolts are loosened. The member 70 has a depending portion 72' which is slidably received in a recess 73 in base portion 15a. Vertical adjustment of member 70 is achieved by rotation of a pointed screw threadedly received in base portion 15a and engaged with the rounded end of the depending portion 72'. The member 70 has a plate 75 on its upper surface with an orifice 75a therein which is in communication with a first air discharge passage 76 defined in part by conduit 76a and extending through member 70. The orifice 75a associated with the workpiece is located between the sides of the cradle support and beneath the workpiece. The orifice 75a, which is in registration with the workpiece, is spaced therefrom to define a gap 75b therebetween. The member 70 has a protruding portion 77 on the side facing the regulating wheel which has an orifice 77a associated with the regulating wheel and in registration therewith. A gap 77b is defined between the orifice 77a and the regulating wheel. The orifice 77a is in communication with a second air discharge passage 78 defined in part by conduit 78a and extending through member 70.

Figure 5:
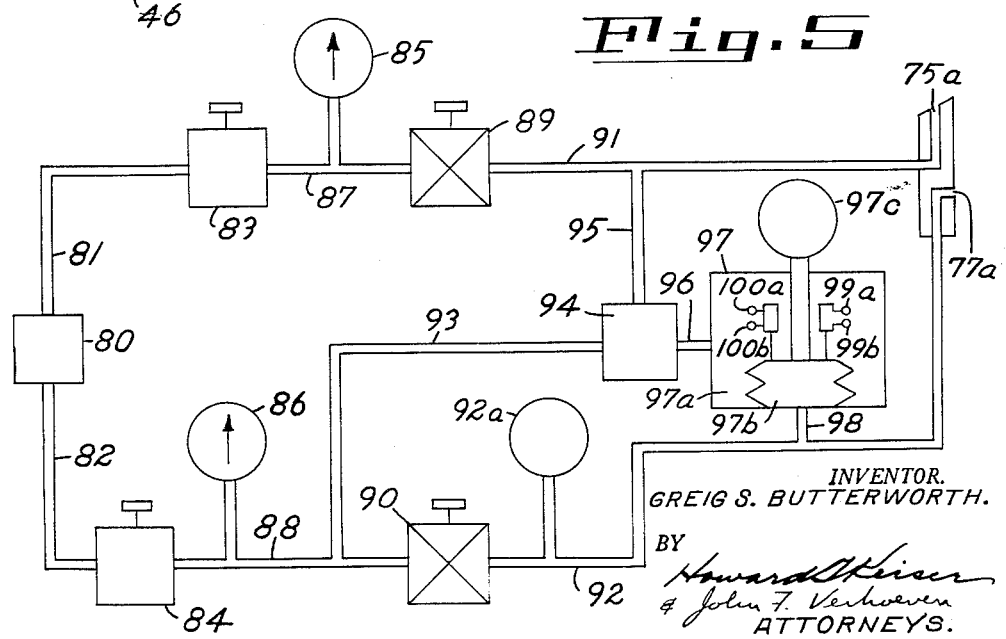
Fig. 5 is a schematic diagram of the pneumatic circuit of the device of the present invention.

As shown in Fig. 5, air under pressure is supplied from a source 80 through lines 81 and 82 to the pressure regulating valves 83 and 84 respectively. From these valves air at constant pressure, measured by gages 85 and 86, is delivered through lines 87 and 88 to the adjustable restrictor valves 89 and 90, respectively. Valve 89 is connected by line 91 to conduit 76a, and hence orifice 75a, and valve 90 is connected by line 92 to conduit 78a, and hence orifice 77a. Thus regulator 83, restrictor 89, air discharge passage 91 and orifice 75a constitute a first branch of the pneumatic circuit associated with the workpiece and regulator 84, restrictor 90, air discharge passage 92, and orifice 77a constitute a second branch of the circuit associated with the regulating wheel. Air at constant pressure as, for example, from line 88 is supplied through line 93 to a reversing relay 94. The reversing relay, which may, for example, be similar to the Model 69, 1:1 ratio reversing relay of Moore Products Co. of Philadelphia, Pennsylvania, has an input port connected by line 95 to line 91, downstream from restrictor 89, and an output port connected by line 96 to the chamber 97a of a differential meter switch 97. The meter switch 97 has a chamber 97b within a bellows which is connected by line 98 to line 92 downstream from restrictor 90. A gage 97c, mechanically actuated by the bellows, indicates the pressure difference between chambers 97a and 97b and two switches having contacts 99a—99b, and 100a—100b, are similarly actuated in response to predetermined pressure differences in the chambers. This unit may be similar to meter switch AME-6 of Federal Products Corporation, Providence, Rhode Island. Gage 92a is connected to line 92 to measure the pressure therein and indicate the size of gap 77b.

As a workpiece settles, or sinks, in the cradle, whether as a result of diminution in size of the workpiece from grinding, or from spreading of the cradle, or both, the surface of the workpiece moves towards orifice 75a, closing gap 75b, and pressure in line 91 will increase. As the cradle spreads and one side thereof is displaced relative to the other side, either because of the deflection of blade 15 or wear of regulating wheel 12, the gap 77b between the orifices 77a and the regulating wheel 12 will increase, causing the pressure in line 92 to decrease. Since the pressure in line 91 is a function of both the diminution of the workpiece and the spread of the cradle, and the pressure in line 92 is a function of only the spread of the cradle, these pressures are utilized in combination to give an accurate indication of the diminution in size of the workpiece. In the circuit of Fig. 5, this combination is accomplished by the reversing relay 94 and the differential meter switch 97 connected in series between the circuit branches. The reversing relay 94 transforms a pressure rise in line 91 to a corresponding and, since a one to one ratio reversing relay is used, an equal drop in line 96 and, conversely, a pressure drop in line 91 is transformed to a pressure rise in line 96. The meter switch compares the pressures in line 96 and 98 and operates switch contacts 99a—99b, and 100a—100b, as well as gage 97c, in response to the difference in pressures in the connected lines.

If the geometry of the device is such that solely as a result of the spread of the support the gap 75b at the workpiece decreases the same amount the gap 77b at the regulating wheel increases, the branch of the circuit associated with the workpiece will require the same sensitivity as the branch associated with the regulating wheel assuming a one to one ratio in the reversing relay used in the connection between the two circuit branches. With this geometry the corresponding elements of the two branches can be identical in size and adjustment. As a result of the cradle spread, pressure in line 92, and hence line 98, will drop because of an increase in the gap associated with the regulating wheel, and since the drop in pressure in line 96, as a result of a decrease of the gap at the workpiece, will equal the drop in pressure in line 98, the gage 97c and the switches will remain unaffected by any spread in the cradle. However, during the grinding operation, the workpiece will settle in the cradle not only as a result of cradle spread but also as a result of diminution in size. To the extent the pressure in line 91 rises, and the pressure in line 96 drops, solely as a result of diminution of workpiece size, there will be no corresponding pressure change in line 98 and the gage 97c and the switches will be operated solely in response to the diminution in size of the workpiece regardless of spread in the cradle. Thus, to the extent the pressure changes in the two branches result solely from cradle spread they are balanced and produce no effect on the indicating means, and unbalanced changes in the pressures, to the extent of the unbalance, will indicate diminution of workpiece size only.

If, as a result solely of the spread of the cradle, the decrease in the size of the gap at the workpiece is either more or less than the increase in the size of the gap at the regulating wheel, the sensitivity of the two branches should differ so that they will react similarly to the different gap size changes resulting solely from the cradle spread. For example, if the gap 75b associated with the workpiece decreases more than the gap 77b at the regulating wheel increases as the cradle spreads, the increase in pressure in line 91, and hence the decrease in pressure in line 96, as a result of the gap change at the workpiece, should equal the pressure decrease in line 98 as a result of the smaller gap change at the regulating wheel. The balancing of the circuit branches to achieve this result may be accomplished by adjusting the sensitivity of one of the branches by adjusting the regulator, the restrictor, or the orifice diameter until, with a workpiece of given size in the cradle, normal spread of the cradle will have no effect on the gage 97c. To determine when this balanced pressure condition has been established the cradle can be moved away from the grinding wheel and a workpiece, of, for example, finished size, placed in the cradle. The cradle can then be spread, as by moving the regulating wheel a slight distance further away from the blade. If the gage 97c moves in a direction to indicate, for example, a greater pressure decrease in line 98 than in line 96, orifice 75a may be enlarged, as for example, by lapping, or restrictor 89 opened, until movement of the regulating wheel will not register on gage 97c. Thereafter during grinding any decrease in pressure in line 96 not offset by a decrease in pressure in line 98 will be solely the result of a decrease in the size of the workpiece.

In the pneumatic circuit of Fig. 5, the pressure in one branch corresponds to the settling of the workpiece as a result of both diminution in size and spread of the cradle and the pressure in another branch corresponds only to the spread of the cradle, and the pressure in the second branch is, in effect, subtracted from the pressure in the first branch so that the indicating means, which is responsive to the difference of pressure in the two branches, will give a true indication of workpiece size only. In the modified circuit of Fig. 6, the indicating means responds to a pressure which is, in effect, the sum of two pressures; one the pressure in the passage communicating with the workpiece orifice and the other the pressure in the passage communicating with the regulating wheel orifice. Pressure from a source 180 is connected to regulator valve 183 by line 181 and a constant pressure is delivered from the valve 183 through line 187 to the adjustable restrictor 189. The pressure in line 187 is indicated by gage 185. Line 191 from the restrictor connects to two passages which may be considered separate circuit branches, passage 190 terminating in orifice 175a and passage 192 terminating in orifice 177a, the orifices being located similarly to the corresponding orifices 75a and 77a, respectively. A gage 197c is connected to line 191 to indicate part size and two pressure switches 193 and 194 having, respectively, contacts 199a—199b, and 200a—200b, are also connected to line 191 for operation in response to the pressure therein. As in the circuit of Fig. 5, the circuit branches must be balanced so the spread of the cradle will have no effect on the indicating means. If spreading of the cradle, without workpiece size diminution, changes the gaps associated with the orifices in like amounts the orifices will be of the same diameter; if the gaps change in different amounts, the orifices must be related in diameter size so that with a workpiece of fixed size therein any normal spread of the cradle, causing the gap at orifice 175a to decrease and the gap at orifice 177a to increase a different amount, will cause no change in the pressure in line 191. When the orifices are sized so that the spread of the cradle without diminution of the size of the workpiece therein causes no pressure change in line 191, it will be known that any change in that line during grinding is solely a result of decrease in size of the workpiece. The contacts 199a—199b are set to close as the workpiece approaches finished size and contacts 200a—200b are set to close when finished size is reached.

Referring to Figs. 3 and 6, in a typical installation of the gaging device of the present invention in a centerless grinding machine having a 12 inch diameter regulating wheel and an opposing blade inclined at 30 degrees from the horizontal, a workpiece of .670 inch (corresponding to its finished size) is supported by the cradle with its center ⅜ inch above the center of the regulating wheel when the unworn surface of that wheel defines a .003 inch gap at orifice 177a, which is located ⅜ inch below a horizontal line passing through the center of regulating wheel. Orifice 175a, positioned on a radial line from the center of the workpiece 30 degrees from a vertical line through the center of the workpiece, is vertically adjusted to define a gap of .003 at orifice 175a. Orifices of .035 and .038 diameter are provided, respectively, at the workpiece (orifice 175a) and at the regulating wheel (orifice 177a) and final balancing of the circuit branches is accomplished by lapping the appropriate orifice. If movement of the regulating wheel with a workpiece of given size in the cradle as described above causes a pressure rise in line 191, orifice 177a is lapped; if gage 197c indicates a pressure drop in line 191 orifice 175a is lapped. The distance between the points where the workpiece contacts the supporting surface 20 and the regulating wheel 12 defines the predetermined size, or span, of the support and with this span one pair of contacts 200a—200b, operable to retract the support from the grinding wheel, may be set to operate when the surface of the workpiece is .003 from the orifice 175a, which will correspond to desired finish size of the workpiece when there is no spread in the support. When the span of the support spreads and is greater than this predetermined span, either because of forces imparted through the workpiece being ground or wear on the regulating wheel from contact with the workpiece being measured or preceding workpieces, a workpiece will not operate the contacts 200a—200b when the gap at orifice 175a is .003 which gap, because of the cradle spread, would be defined by an oversize workpiece. Instead, because of the compensation provided in the pneumatic circuit by the gap at orifice 177a which increases as the cradle spreads, the contacts 200a—200b will not be operated until the gap at the workpiece is less than .003 an amount determined by the amount of the spread. It will be evident that the regulating wheel will have to be advanced periodically when the wear therein causes a cradle spread greater than the limits for which the device provides compensation.

Therefore both circuits shown respond to predetermined pressure conditions established by the combination of pressures, one of the pressures indicating settling of the workpiece in the cradle and the other of the pressures indicating spread of the cradle only, to actuate means in the circuit to give an indication of decrease in workpiece size only and control movement of the support in accordance therewith.

Figure 7:
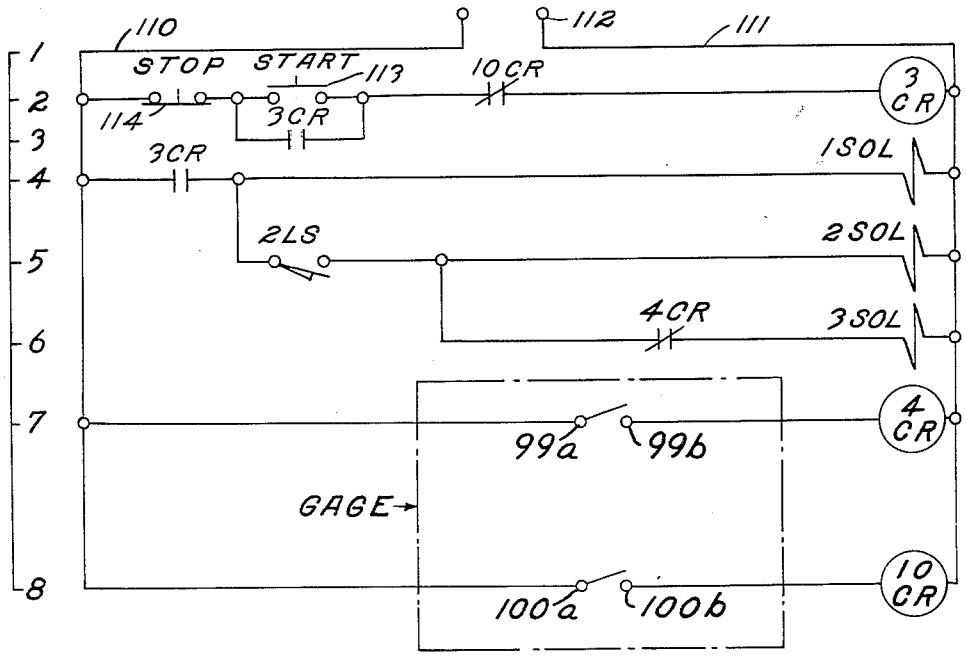
Fig. 7 is a schematic diagram of the electrical circuit of the infeed mechanism of the machine of Fig. 1.

The specific manner in which the gauge controls the operation of the infeed mechanism is shown by the wiring diagram in Fig. 7. The electrical circuit includes a pair of conductors 110 and 111 which are connected by terminals 112 with a source of energizing current. A grinding cycle is initiated by depression of a start push button 113 (line 2) which energizes a control relay 3CR through a normally closed stop push button 114 and the normally closed contacts of a relay 10CR. When the relay 3CR is energized, the normally open contacts of this relay in line 3 are closed, thereby establishing a holding circuit around the start push button 113 which maintains the relay energized. At the same time, a pair of normally open contacts of the relay 3CR in line 4 are closed, thereby energizing the solenoid 1SOL (see also Fig. 2) which operates valve 34 and initiates rapid traverse of the slides 13 and 14, and hence the workpiece support, toward the work. At the conclusion of the rapid traverse movement, the limit switch 2LS (line 5) is closed, thereby energizing solenoid 2SOL (line 5) which operates solenoid valve 47 and initiates operation of the rack piston (Fig. 2). Simultaneously, the solenoid 3SOL (line 6) is energized through the normally closed contacts of a relay 4CR (line 7). Hence, the solenoid valve 59 is operated, thereby connecting the rapid feed rate throttle valve 62 with the line 57 so as to cause the workpiece support to be advanced into the grinding wheel at a fast feed rate.

Switch contacts 99a—99b (199a—199b) are set to close in response to a predetermined pressure condition established in the pneumatic circuit as the workpiece approaches finished size. This energizes relay 4CR to open the normally closed contacts (line 6) thereof. Thereupon, solenoid 3SOL will be deenergized, thus closing valve 59 and cutting off the flow of return fluid through the fast feed rate throttle valve 62. The fluid from the cylinder 54 will now be forced to flow through the fine feed rate throttle valve 65, thereby reducing the infeed movement of the workpiece support to a fine feed rate. When the diameter of the workpiece has reached its finished size, the switch contacts 100a—100b) (200a—200b) will close. This will energize a control relay 10CR, thereby opening the contacts of this relay in line 2. The relay 3CR is thereby deenergized so as to open its contacts in line 4 and deenergize solenoid 1SOL. The solenoid valve 34 thereby returns to the position shown in Fig. 2 which causes the piston 43 to move to the right in cylinder 42 and retract the workpiece support from the grinding wheel. The opening of contacts 3CR in line 4 also deenergizes solenoid 2SOL thereby returning the rack piston 55 to the position shown in Fig. 2. When the workpiece is removed from the cradle, the pressure in the passage connected to the workpiece orifice drops and contacts 99a—99b (199a—199b) and 100a—100b (200a—200b) are again opened. Control relay 10CR is thereby deenergized to close contacts 10CR in line 2 ready for the next operation. Since contacts 3CR in line 3 are now open, relay 3CR will remain deenergized until the start push button 113 is again depressed in order to initiate the next grinding cycle.

What is claimed is:

1. In a machine tool, a device for gaging the size of a workpiece in process comprising means defining a cradle having sides to support the workpiece, a first sensing means responsive to settling of the workpiece in a cradle, a second sensing means responsive to spread of the cradle, and indicating means responsive to both sensing means.

2. In a centerless grinding machine having two spaced wheels defining a grinding throat, the machine having a blade extending into the throat, one of said wheels and the blade constituting sides of a cradle support inclined relative to each other to receive a cylindrical workpiece, the workpiece settling in the support in accordance with the diameter of the workpiece and the spread of the support from a predetermined span, a device for gaging the size of the workpiece in process comprising a first sensing means responsive to the amount the workpiece has settled in the cradle, a second sensing means responsive to the spread of the support from said predetermined span, and means responsive to both of said sensing means to indicate the diameter of said workpiece.

3. In a centerless grinding machine having two spaced wheels defining a grinding throat, the machine having a blade extending into the throat, one of said wheels and the blade constituting the sides of a cradle support for a cylindrical workpiece, a device for gaging the size of the workpiece comprising a first sensing means in registration with the workpiece and responsive to settling of the workpiece in the cradle support, a second sensing means connected to the blade and in registration with said one wheel responsive to displacement of one of said sides of the cradle support relative to the other side thereof, and means controlled by both sensing means to indicate the size of the workpiece.

4. In a centerless grinding machine having a grinding wheel and a regulating wheel defining a grinding throat, the machine having a blade extending into the throat with an upper face sloping downwardly toward the regulating wheel, the face of the blade and the regulating wheel defining a support for a cylindrical workpiece, the workpiece settling in the support as it diminishes in size from grinding and as the support spreads, a device for gaging the size of the workpiece comprising a first sensing means in registration with the workpiece and operable in accordance with the amount the workpiece settles in the support, a second sensing means connected to the blade and in registration with the regulating wheel operable in accordance with the amount the sides of the support are displaced relative to each other when the support spreads from a predetermined size, the second sensing means balanced in relation to the first sensing means to respond to the displacement of the sides of the support for a given spread of the support similarly to the response of the first sensing means to the settling of the workpiece in the support due solely to said spread, and means responsive to both sensing means to indicate the amount the workpiece settles in the support solely from diminution in size.

5. In a centerless grinding machine having a grinding wheel and a regulating wheel defining a grinding throat, the machine having a blade extending into the throat with an upper face sloping downwardly toward the regulating wheel, the face of the blade and the regulating wheel defining a support for a cylindrical workpiece, said support being movable towards and away from the grinding wheel, a signaling device for controlling the movement of said support comprising means defining a first air discharge passage, said first air passage terminating in an orifice in registration with the workpiece and spaced therefrom to define a gap therebetween, a member connected to the blade having a second air discharge passage, said second air discharge passage terminating in an orifice in registration with the regulating wheel and spaced therefrom to define a gap therebetween, means including a source of air under pressure connected to said passages for discharge of air through said gaps, and means operatively connected to said air passages and responsive to the size of both gaps to control the movement of the support.

6. In a centerless grinding machine having a grinding wheel and a regulating wheel defining a grinding throat, the machine having a blade extending into the throat with an upper face sloping downwardly toward the regulating wheel, the face of the blade and the regulating wheel defining a support for a cylindrical workpiece, said support being movable towards and away from the grinding wheel, a signaling device for controlling the movement of said support in accordance with the diminishing size of the workpiece comprising means defining a first air discharge passage having an orifice beneath the workpiece and in registration therewith between the blade and the regulating wheel, a member connected to the blade having a second air discharge passage, said second air discharge passage having an orifice in registration with the regulating wheel, a source of air under pressure connected to said discharge passages, restricting means in said discharge passages, means to move the support toward the grinding wheel, means responsive to a predetermined pressure condition established by the combined pressures in both of said air passages downstream from said restricting means to retard the movement of said support toward the grinding wheel, and means responsive to a second predetermined pressure condition established by the combined pressures in both of said air passages downstream from said restricting means to reverse the movement of said support.

7. In a centerless grinding machine having two spaced wheels defining a grinding throat, the machine having a blade extending into the throat, one of said wheels and the blade constituting the sides of a cradle support for a cylindrical workpiece comprising in combination means defining two pneumatic circuit branches, each of said branches including a source of air at constant pressure, a restrictor, and each terminating at an orifice, the orifice of one branch in registration with the workpiece and the orifice of the other branch in registration with the regulating wheel, means to compare the pressure changes in said branches downstream from the restrictors, and indicating means responsive to said pressure comparing means.

8. In a centerless grinding machine having a grinding wheel and a regulating wheel defining a grinding throat, the machine having a blade extending into the throat with an upper face sloping downwardly toward the regulating wheel, the face of the blade and the regulating wheel defining a support for a cylindrical workpiece, a device for indicating the size of the workpiece comprising means defining an orifice between the blade and the regulating wheel below the surface of a workpiece supported in the cradle and in registration therewith, a member connected to the blade having an orifice in registration with the regulating wheel, a pair of pneumatic circuit branches each having a restrictor therein and an air discharge passage connecting the restrictor to one of said orifices, respectively, a pressure reversing relay, and indicating means operable in response to the difference in two pressures connected in series with the pressure reversing relay between the air discharge passages of the two circuit branches.

9. In a centerless grinding machine having a grinding wheel and a regulating wheel defining a grinding throat, the machine havin a blade extending into the throat with an upper face sloping downwardly toward the regulating wheel, the face of the blade and the regulating wheel constituting the sides, respectively, of a cradle support for a cylindrical workpiece, a device for indicating the size of a workpiece in the support comprising pneumatic means including a first circuit branch and a second circuit branch, the first circuit branch operable to sense the amount the workpiece settles in the support, said first branch including a first air passage terminating in a first orifice in registration with a workpiece carried in the support and spaced therefrom to define a gap therebetween, the second circuit branch operable to sense the spread of the support, said second branch including a second air passage terminating in a second orifice carried by the blade in registration with the regulating wheel and spaced therefrom to define a gap therebetween, said pneumatic means operable to produce a predetermined pressure change in each of said circuit branches in response to a predetermined change in the gap at the orifice of each circuit and operable to produce balanced pressure changes in said branches in response to the gap changes produced as a result of cradle spread only, and means responsive to unbalanced pressure changes in said circuit branches to indicate the amount the workpiece has settled in the support as a result of diminution in size only.

10. In a centerless grinding machine having a grinding wheel and a regulating wheel defining a grinding throat, the blade and the regulating wheel defining a support for a cylindrical workpiece, a device for indicating the size of the workpiece comprising a first pneumatic circuit branch associated with the workpiece terminating in an orifice and having a restrictor and a first air discharge passage connecting the restrictor to the orifice, the orifice of the first circuit branch in registration with the workpiece and spaced therefrom to define a gap therebetween, a second pneumatic circuit branch associated with the regulating wheel terminating in an orifice and having a restrictor and a second air discharge passage connecting the restrictor to the orifice, the orifice of the second circuit supported by the blade in registration with the regulating wheel and spaced therefrom to define a gap therebetween, the gaps at the workpiece and the regulating wheel changing in size as the cradle is spread with a workpiece therein, the circuit branches adjusted to produce pressure changes of the same magnitude in the air discharge passages when the cradle is spread with a workpiece therein, and indicating means responsive to the difference in pressure changes in said air discharge passages.

References Cited in the file of this patent

UNITED STATES PATENTS

| | | |
|---|---|---|
| 2,521,979 | Jagen | Sept. 12, 1950 |
| 2,652,663 | Taylor | Sept. 22, 1953 |
| 2,889,665 | Jessup | June 9, 1959 |